US012668460B2

(12) United States Patent
Scholz et al.

(10) Patent No.: US 12,668,460 B2
(45) Date of Patent: Jun. 30, 2026

(54) CRANE

(71) Applicant: Liebherr-Werk Biberach GmbH, Biberach an der Riss (DE)

(72) Inventors: Tobias Scholz, Biberach (DE); Sebastian Sturm, Mittelbiberach (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 155 days.

(21) Appl. No.: 18/614,138

(22) Filed: Mar. 22, 2024

(65) Prior Publication Data

US 2024/0228236 A1 Jul. 11, 2024

Related U.S. Application Data

(63) Continuation of application No. PCT/EP2022/074637, filed on Sep. 5, 2022.

(30) Foreign Application Priority Data

Sep. 24, 2021 (DE) ......................... 102021124757.8

(51) Int. Cl.

*B66C 13/00* (2006.01)
*B66C 13/08* (2006.01)
*B66C 13/40* (2006.01)
*B66C 13/46* (2006.01)

(52) U.S. Cl.

CPC ............ *B66C 13/085* (2013.01); *B66C 13/40* (2013.01); *B66C 13/46* (2013.01)

(58) Field of Classification Search

CPC ..... B66C 13/04; B66C 13/063; B66C 13/085; B66C 13/14; B66C 13/28; B66C 13/40; B66C 13/46

See application file for complete search history.

(56) References Cited

U.S. PATENT DOCUMENTS

| | | | | |
|---|---|---|---|---|
| 3,498,476 | A | 3/1970 | Mattson et al. | |
| 8,944,262 | B2 * | 2/2015 | Willim | B66C 23/185 212/273 |
| 11,932,516 | B2 * | 3/2024 | Hänsler | B66C 1/40 |
| 2011/0066394 | A1 * | 3/2011 | Schneider | B66C 13/16 702/101 |

(Continued)

FOREIGN PATENT DOCUMENTS

| | | |
|---|---|---|
| DE | 2515178 | 10/1975 |
| DE | 19927140 C2 | 10/2000 |
| DE | 102012220975 | 5/2014 |

(Continued)

*Primary Examiner* — Emmanuel M Marcelo

(74) *Attorney, Agent, or Firm* — Levine Bagade Han LLP

(57) ABSTRACT

The present invention relates to a crane, for example in the form of a tower crane, telescopic boom crane or port crane, comprising a load holding means which is hinged to a hoist rope and by means of which rope can be lifted and lowered, the load holding means having a rotary drive for rotating a load coupling part with respect to a rope hinge part hinged to said hoist rope about an upright load holding axis of rotation. According to the invention, the rotary drive is designed as an inertia drive and has a flywheel which is mounted on the load hook or load coupling part so as to be rotatable about the upright load holding axis of rotation and can be rotationally driven by a drive motor.

22 Claims, 5 Drawing Sheets

(56) References Cited

U.S. PATENT DOCUMENTS

| | | | | |
|---|---|---|---|---|
| 2022/0371862 | A1* | 11/2022 | Wiedemann | B66D 3/06 |
| 2023/0391588 | A1* | 12/2023 | Maier | B66C 15/065 |

FOREIGN PATENT DOCUMENTS

| | | | | | |
|---|---|---|---|---|---|
| DE | 102019205329 | | | 10/2020 | |
| EP | 0409748 | B1 | | 12/1992 | |
| JP | S56-141288 | | | 11/1981 | |
| JP | 2012-111570 | | | 6/2012 | |
| NL | 9301243 | A | * | 2/1995 | B66C 13/085 |
| SU | 1039850 | A1 | * | 9/1983 | |
| WO | WO 2017/174202 | A2 | | 10/2017 | |
| WO | WO 2018/090104 | | | 5/2018 | |
| WO | WO 2020/221929 | | | 11/2020 | |
| WO | WO 2023/046453 | | | 3/2023 | |

* cited by examiner

CRANE

CROSS-REFERENCE TO RELATED APPLICATIONS

This application is a continuation of International Patent Application Number PCT/EP2022/074637 filed Sep. 5, 2022, which claims priority to German Patent Application Number DE 10 2021 124 757.8 filed Sep. 24, 2021, which are incorporated herein by reference in their entireties.

BACKGROUND

The present invention relates to a crane, for example in the form of a tower crane, telescopic boom crane or port crane, comprising a load holding means which is hinged to a hoist rope and by means of which rope can be lifted and lowered, the load holding means having a rotary drive for rotating a load coupling part with respect to a rope hinge part hinged to said hoist rope about an upright load holding axis of rotation.

For cranes whose load hook extends from a crane jib or crane bridge via a hoist rope, the load attached to the crane hook usually tends to twist. On the one hand, the rotational resistance of the hoist cable system is quite low, especially if the hoist rope has to overcome a greater distance to the articulation point, for example a trolley, when the load hooks are lowered relatively far. On the other hand, the load hook itself is often mounted on the hook block so that it can rotate freely to allow the load to be maneuvered when it is set down. The slinging means between the load hook and the load, for example in the form of chains or lift belts, also offer relatively little resistance to unintentional twisting. Such an unintentional twisting can occur, for example, due to lateral wind loads and, independently of this, makes it difficult to automate the load lifts or to set it down precisely and automatically in a desired rotational position. In addition, unintentional twisting of the load can also result in damage to buildings or even people.

Today, loads such as concrete buckets, prefabricated construction or wall parts or other building materials attached to the load hook are usually maneuvered manually by means of a rope hinged to it and brought into the desired rotationally rotated position, wherein such a guide rope is usually guided by a person at the pick-up location and also by a person at the drop-off location, which requires a transfer of the guide rope, especially if a greater height difference has to be overcome and the guide person cannot move along with the moving load. Such manual maneuvering using a guide rope may also require coordination with the crane operator by radio or other means of communication. In addition, attaching and detaching the guide rope requires additional time. Irrespective thereof, there is always a risk of injury due to the proximity of the guide to the load.

It has therefore already been proposed to simplify the rotationally maneuvering of attached loads by using a rotary drive for the load hook. By means of such a rotary drive, the load hook, which is mounted on the lower block so as to be rotatable about an upright axis of rotation, can be rotated by a motor with respect to the lower block on which the hoist rope is reeved, wherein a hydraulic or electric drive motor is provided and may be coupled to the rotatable load hook via a transmission, cf. for example DE 199 27 140 C2, which proposes to provide a slip clutch in the rotary drive train between the drive motor and the load hook in order to avoid excessive twisting of the hoist cable system or even overloading of the rotary drive.

EP 0 409 748 B1 also describes a load hook with a rotary drive for a tower crane, which is designed to obtain its energy from the hoisting movement of the hoist rope. More specifically, it is proposed to couple a generator to one of the deflection pulleys of the hook block and to store the electric power generated by this during hoist rope movements in a rechargeable battery in order to supply an electric drive motor of the rotary drive with energy. The drive motor housed in the lower block is connected to the load hook drive via a multi-stage spur gear, which is mounted on the hook block so that it can rotate about an upright axis of rotation.

Furthermore, WO 2017/174202 A2 shows a tower crane whose load hook has automatic coupling means into which loads to be struck can be hooked with a mushroom-shaped coupling head. Control buttons are provided on the lower block for controlling the crane's travel movements so that the load hook can be directed directly at the load hook. In addition, smart gloves with sensors are used so that a guide can press against the load itself with the gloves and maneuver the load using various hand movements that are detected by sensors.

It is the underlying object of the present invention to create an improved crane of the said type, which avoids disadvantages of the prior art and further develops the latter in an advantageous manner. In particular, the aim is to enable precise maneuvering and controlling of loads on the load holding means of the crane, without the need to be concerned about the twisting of the hoist rope or the need for sensitive, complex control equipment. It should preferably be possible to attach various end tools quickly and easily to the load holding means and their functions should be supported by the crane.

SUMMARY

Said task is solved, according to the invention, with a crane. Preferred embodiments of the invention are the subject-matter of the dependent claims.

According to a first aspect, it is therefore proposed to employ the principle of inertia in order to twist the load hook or the load coupling part of the load holding means and to generate a torque or a twisting actuating force on the rotatable load receiving part itself in order to avoid undesirable reactions or deflections on the hoist rope or even twisting of the hoist rope. According to the invention, the rotary drive is designed as an inertia drive and has a flywheel which is mounted on the load hook or load coupling part so as to be rotatable about the upright load holding axis of rotation and can be rotationally driven by a drive motor. If the drive motor accelerates or brakes said flywheel, a rotational pulse is generated on the load holding part in response to the principle of inertia and the latter is rotationally twisted accordingly or subjected to a torque.

In this respect, rotationally accelerating the flywheel or drive motor in a clockwise direction can generate an angular momentum or torque on the load holding part in an anti-clockwise direction, while conversely accelerating the flywheel in an anti-clockwise direction generates a torque on the load holding part and the load suspended from it in a clockwise direction. Similar rotary impulses or torques can also be generated by braking the flywheel. If, for example, a flywheel rotating in a clockwise direction is braked—which corresponds to counterclockwise acceleration, so to speak—a clockwise torque can be generated on the load or the load holding part.

In a further development of the invention, the rotatable load holding part can be hinged to the rope hinge part so that it can rotate largely freely by means of a pivot bearing, so that no or at least no significant torques are transmitted to the hoist rope also when the rotary drive is active. In principle, it would also be possible to provide a brake or to give the swivel bearing greater friction in order to slow down rotational movements of the load holding part with respect to the rope hinge part, wherein a braking device could be configured as a friction brake, for example, or also as a viscous or fluid brake. Such a rotationally braking effect can be advantageous, for example, to prevent uncontrolled twisting of the load holding part with respect to the rope hinge part when the rotary drive is deactivated. Advantageously, the frictional resistance with respect to the twisting or the braking effect is dimensioned in such a way that no major part or also no part at all of the torque generated is transmitted to the hoist cable system during active rotary drive.

According to a further aspect of the present invention, the drive motor of the rotary drive for rotating the load coupling part with respect to the rope hinge part can in particular be attached in a rotationally fixed manner to the rotatable load coupling part and can rotate with the load coupling part with respect to the rope hinge part. Until now, the drive motor was usually provided on the rope hinge part, which, together with the deflection pulleys for the hoist rope usually provided there, leads to space problems and is also disadvantageous in terms of retrofitting the rotary drive. In particular, the drive motor can be rotationally fixed to the load coupling part with respect to the upright axis of rotation or at least only be movable to a limited extent by means of stops, for example fixed, in particular rigidly mounted on the load coupling part. If the drive motor accelerates said flywheel or brakes said flywheel, a bearing reaction force or torque is transmitted from the drive motor to the rotatably mounted load coupling part due to the principle of mass inertia, so that the load coupling part with the load attached to it undergoes a rotational movement or an existing or currently developing rotational movement is counteracted.

In order to save space, said drive motor can advantageously be arranged coaxially to the axis of rotation of the flywheel, wherein, for example, a motor output shaft can be coupled directly to the flywheel. For example, the drive motor can be located on the flywheel and its motor axis can be aligned upright or coaxial with the pivot bearing axis about which the load coupling part can be rotated with respect to the rope hinge part. Preferably, the motor output shaft is detachably coupled to the flywheel mass in order to be able to mount flywheels of different sizes or weights depending on the load to be absorbed and thus adapt the moment of inertia to the application or load.

In principle, however, it would also be possible to position the drive motor eccentrically to the flywheel axis and transmit the rotary motion via a suitable gear stage, for example in the form of one or more spur gear stages.

The drive motor can be firmly connected with its motor housing to a frame or housing section of the load coupling part.

The said flywheel can, for example, be configured to the form of a solid, cylindrical disk. Alternatively, however, other flywheel designs are also possible, for example a strut or spoke frame to which one or more flywheel masses are attached at a radial distance from the axis of rotation in order to achieve a still favorable weight with high rotationally inertia, since mass components located further out are more important for the mass moment of inertia than mass components located further in or closer to the axis of rotation.

In any case, the said flywheel is dimensioned with regard to its mass moment of inertia in such a way that a noticeable rotational effect can also be generated by braking or accelerating with larger loads attached to the load holding means. In any case, the mass moment of inertia of the flywheel is several times the mass moment of inertia of the gears of a gear stage or several times the mass moment of inertia of the motor shaft of the drive motor or several times the mass moment of inertia of the rotating motor assembly including the rotor and motor gearbox and advantageously also several times the sum of the mass moments of inertia from the running motor assembly and any overdrive or reduction gearbox provided. For example, the mass moment of inertia of the flywheel can be at least one power of ten higher than the mass moment of inertia of the running engine assembly.

In principle, the rotary drive can be configured in various ways, wherein the rotary drive advantageously comprises an energy storage unit that can be attached to the load holding means and/or possibly also to the load to be suspended from it in order to be able to supply the rotary drive with energy autonomously without complex cabling. Depending on the design of the rotary drive, such energy storage can include a pressure accumulator, for example, in order to be able to drive a hydraulic motor. In particular, however, an electric drive motor can be provided and the energy storage system can be configured to store electric power, wherein in particular one or more batteries and/or one or more capacitors can be provided to store the electric power.

Advantageously, the energy storage device can be detachably attached to an outside of the rope hinge part, wherein form-fitting holding means for holding the energy storage device can be provided for example on the outside of the rope hinge part. For example, the energy storage can be latched to the outside of the rope hinge part and/or attached to a receiving pocket in a pluggable and/or form-fitting manner.

Simple, detachable mounting of the energy storage unit on the outside means that interchangeable batteries can be used, for example. Simultaneously, by attaching the energy storage unit to the load holding means, ballast weights that would otherwise be provided there can be saved or reduced in size.

Advantageously, an energy generator can be provided on the load holding means, which can generate the energy required to supply the drive motor directly on the load holding means. In particular, such an energy generator can convert movements or kinetic energy occurring at the load holding means into electric or possibly also hydraulic or pneumatic energy and make it available to the drive motor or store it in said energy storage. In particular, the energy generator can be driven by movements of the hoist rope, wherein the energy generator can in particular be drivingly connected to a deflection pulley around which the hoist rope revolves and which is rotatably mounted on the rope hinge part of the load holding means. For example, a generator can be coupled directly to said deflection pulley or connected to the drive via a gear stage in order to use the rotary movement of the deflection pulley to generate electricity during lowering or lifting movements. Alternatively or additionally, a pump could also be coupled directly or indirectly to said deflection pulley, for example to fill a pressure accumulator from which a hydraulic motor can then be fed.

The rope hinge part of the load holding means can in particular form the lower block of the hoist cable system, on which the hoist rope can be reeved in one or more times. The rope hinge part can have one or more deflection pulleys for this purpose, which can be mounted on a hook block frame so that they can rotate about horizontal axes of rotation in the intended operating orientation.

The energy generator, for example in the form of said generator, can be mounted on said rope hinge part, for example mounted inside a frame or a housing part of the lower block, on which the at least one deflection pulley is also rotatably mounted.

In a further development of the invention, however, twisting movements of the load coupling part with respect to the rope hinge part can also be used to generate energy. In particular, electric power generated by the drive motor, which then acts as a generator, when said flywheel is braked can be stored or fed back into said energy storage system.

In order to be able to reliably transmit the rotational movement and/or possibly other positioning movements to various loads to be picked up, the rotatable load coupling part can advantageously comprise a quick-coupler or a quick-coupler mechanism which can fix various end tools, such as a concrete bucket or a load gripper, in a rotationally fixed manner about the described upright axis of rotation, in particular also rigidly to the load coupling part, and in particular can lock them in a form-fitting manner.

Advantageously, said quick-coupler can comprise a defined, geometric interface that can be brought into a rotationally fixed manner, in particular locking engagement, with a complementary interface on the load to be coupled, for example the concrete bucket or the load grab. For example, the quick-coupler interface can comprise protrusions and/or recesses that can be brought into form-fitting engagement with suitably shaped recesses and/or protrusions on the end tool to be coupled, which prevents the coupled end tool from rotating about the upright axis of rotation.

Alternatively or additionally, the quick-coupler can also comprise movable, form-fitting locking elements, for example in the form of a coupling mouth open to one side, into which a transverse bolt on the end tool can be inserted, and a movable locking element that can fix a matching counter-contour on the end tool in such a way that said transverse bolt can no longer slip out of the coupling mouth. In principle, however, other locking elements are also possible, for example claws that can be swung in and out, cross slides or bayonet-like torsion contours that can be engaged.

Advantageously, said quick-coupler is configured to not only hold the end tools in a torsion-proof manner, but the end tool as a whole can be locked rigidly to the load coupling part.

Advantageously, said quick-coupler also comprises an energy and/or signal line interface in order to be able to transmit energy and/or signals from the load holding means of the crane to the coupled end tool or vice versa from the coupled end tool to a control device of the crane. The said energy and/or signal interfaces are advantageously detachably configured, for example in the form of plug-in contacts and/or plug-in connections, which can be configured, for example, in such a way that they automatically engage or connect with each other when the end tool is mechanically coupled to the load coupling part and are detached when it is uncoupled.

In order to be able to control the slewing gear function of the load holding means and/or functions of the respectively coupled end tool such as concrete bucket or load gripper, or also functions or movements of the crane or the crane structure itself, the crane can advantageously comprise a control unit which can have an electronic data processing device, for example with a microprocessor and a program and/or working memory, in which software comprising control routines to be processed can be stored and processed.

In particular, such a control unit can be configured to take into account at least one sensor signal for controlling the rotary drive of the load holding means, i.e. for rotating the load coupling part with respect to the rope hinge part, which reflects at least one operating and/or environmental parameter of the crane detected by the sensor, in order to control the rotary drive automatically or semi-automatically in dependence on the sensor signal.

In particular, a wind sensor may be provided, for example mounted on the crane structure, in order to detect the strength and/or direction of the wind in the working environment of the load hook, wherein the control unit may be configured to control the rotary drive in dependence on the wind signal, in particular such that a torque on the coupled load resulting from the wind is counteracted.

Alternatively or additionally, a movement and/or position sensor can be provided, for example comprising a torsion sensor, which can detect movements and/or rotations of the load on the load holding means and/or rotations of the load coupling part of the load holding means, wherein the control unit can be configured to control the rotary drive in dependence on a movement and/or position signal, in particular a torsion signal, for example to counteract an unwanted rotation of the load and/or to move to a predetermined rotational position at the unloading point and/or on the travel path.

For example, a gyroscope or a gyroscopic sensor can be used to detect the rotational position of the load coupling part and/or the load attached to it, wherein such a gyroscope can be attached to the load coupling part and/or the load itself, for example. The controlling unit then controls the rotary drive in dependence of the gyroscope signal.

Alternatively or additionally, the control unit can also be configured to receive and process information from a construction site information database, in particular a so-called Building Information Model BIM, and to control the rotary drive of the load holding means in dependence on at least one piece of information from the BIM or the database. For example, the control unit can take a target rotational position from the BIM at the set-down or target point of a travel path and then control the rotary drive so that the load is moved to the desired rotational position at the target point. Alternatively or additionally, the control unit can also take the orientation of the load to be picked up at the pick-up point from the BIM in order to control the rotary drive using the BIM information so that the load coupling part has the appropriate rotary position for picking up the load.

However, as an alternative or in addition to automatic or semi-automatic control of the rotary drive using specific sensor signals or lift job information, the control unit can also process manual control commands that are input by a machine operator using suitable input means, such as a touchscreen or joystick, so that the rotary drive can be controlled manually.

In order to enable simple controlling in the immediate vicinity of the coupled load of the load holding means, at least one input means and/or at least one sensor for detecting control-relevant machine operator actions can also be provided on the respective end tool to be coupled in an advantageous further development of the invention.

For example, a touch and/or pressure sensor and/or other actuatable input means such as an actuation switch can be provided on the end tool to enable the machine operator to input control commands directly on the coupled end tool. If, for example, a concrete bucket is coupled, an input means for opening and closing an outlet opening of the concrete bucket can be provided on the concrete bucket. For example, a positioning actuator can be actuated via the input means, which is supplied with energy from the load holding means via the aforementioned energy line.

Alternatively or additionally, a sensor system and/or other input means can be provided on the end tool, for example the concrete bucket, in order to be able to input control commands for the rotary drive. For example, two pressure sensors can be attached to the end tool, in particular the concrete bucket, whose signals are converted to a clockwise or counterclockwise rotation. If, for example, a pressure sensor located further to the right is pressed with the palm of the hand or a finger, this can trigger a clockwise rotation of the rotary drive, while pressing a sensor located further to the left can trigger a rotation in the opposite direction.

Said sensor system may in particular be configured to detect a force acting on the end tool, wherein said control unit may be configured to actuate the rotary drive of the load holding means and/or possibly also other traversing drives of the crane, such as a trolley drive or a slewing gear of the tower crane, in dependence on the detected force or the detected forces on the end tool.

If the end tool is a load gripper, input means and/or a sensor system can be attached to the load gripper in a similar way in order to be able to input control commands for rotating and/or positioning the load gripper directly on the load gripper, for example to control the rotary drive and/or actuate other crane drives.

In particular, input means, for example in the form of a pressure sensor or an input switch, can also be provided on the load gripper in order to close and/or open a gripper coupling by means of which a load can be coupled to the load gripper.

BRIEF DESCRIPTION OF THE DRAWINGS

The invention will be explained in more detail in the following with respect to preferred embodiments and to associated drawings. The drawings show.

DETAILED DESCRIPTION

Figure 1:
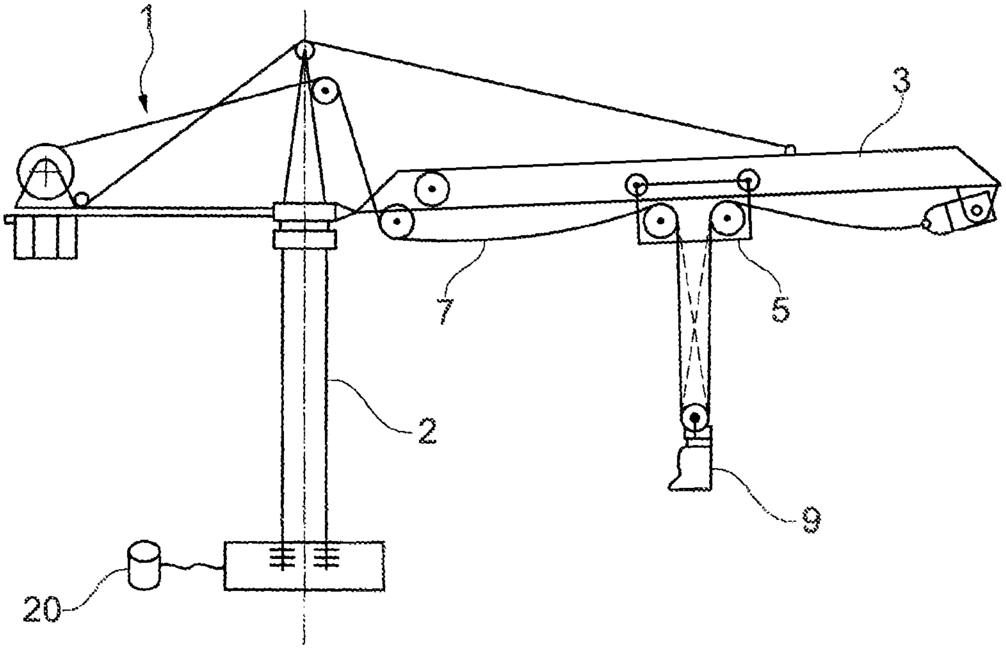
FIG. 1: a side view of a crane in the form of a tower crane according to an advantageous embodiment of the invention, to the load holding means of which an end tool in the form of a concrete bucket is coupled.

As shown in FIG. 1, the crane 1 can be configured to be a tower crane and have a jib 3 from which the hoist rope 7 extends, to which a load holding means 4 is hinged in order to be raised or lowered by retracting or lowering the hoist rope 7. Said load holding means 4 could classically be a load hook, but in an advantageous embodiment it is a quick-coupler, as will be explained in more detail. In order to be able to couple an end tool 9 such as a concrete bucket in a rotationally fixed manner, see FIG. 1 and FIG. 3.

Said hoist rope 7 can extend from a trolley 5, which can be moved along the jib 3 by means of a trolley drive in order to be able to move the load holding means 4 to the desired location.

Said jib 3 can be supported by a tower 2 and can be rotated opposite or together with the tower 2 about an upright axis of rotation by a slewing gear in order to be able to move the load holding means 4 to the desired location.

Figure 2:
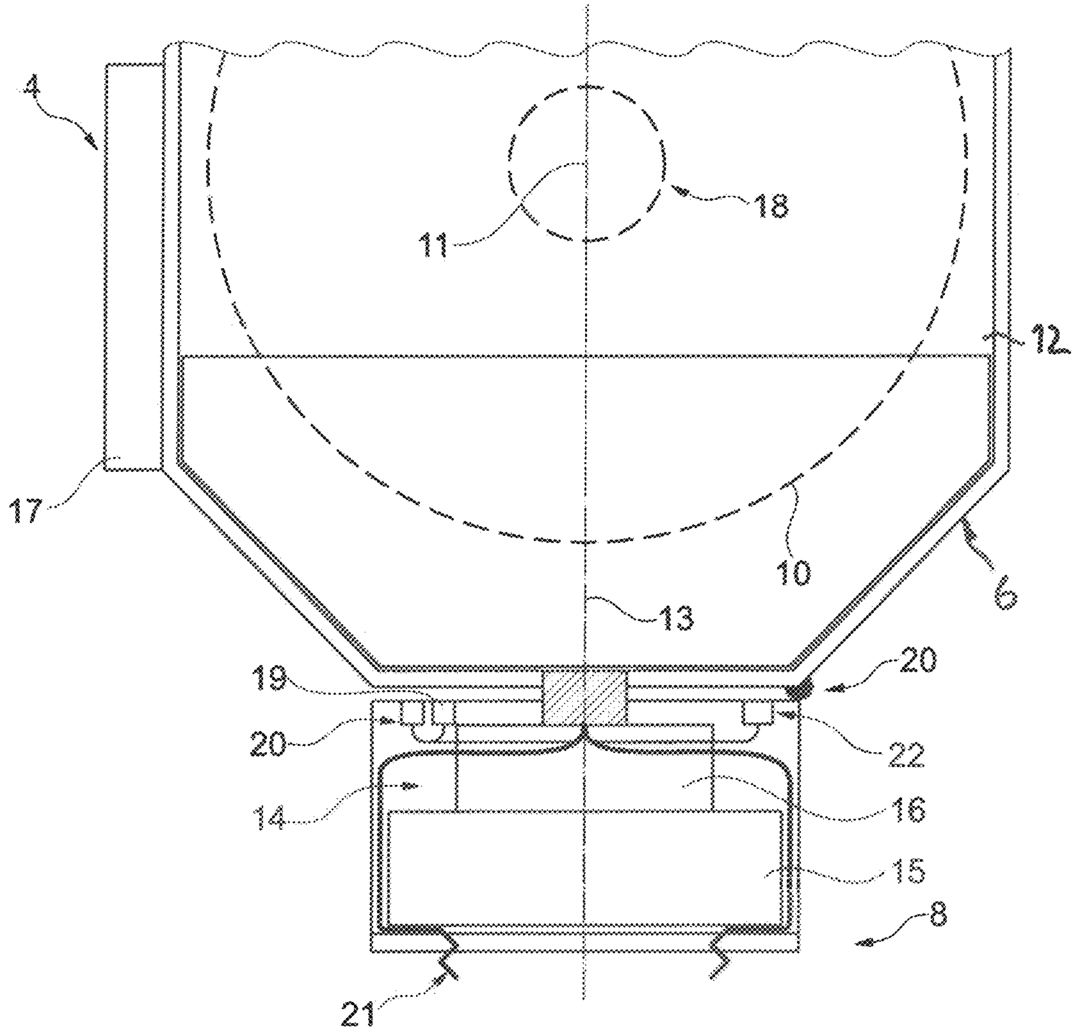
FIG. 2: a partially cut-away side view of the load holding means hinged to the hoist rope of the crane of FIG. 1, showing the rope hinge part in the form of a lower block and the load coupling part rotatable with respect thereto, wherein the rotary drive for rotating the load coupling part comprises a flywheel arranged rotatably on the load coupling part and a drive motor.

As shown in FIG. 2, the load holding means 4 comprises a rope hinge part 6, which is hinged to the hoist rope 7, and a load coupling part 8, to which the respective load to be coupled can be coupled, for example in the form of the said concrete bucket 9.

The rope hinge part 6 can form a lower block with one or more deflection pulleys 10, on which the hoist rope 7 is reeved one or more times, wherein said deflection pulleys 10 are mounted rotatably about a horizontal pulley rotation axis 11 on a deflection or lower block support 12.

The load coupling part 8 can be arranged suspended below said rope hinge part 6 and rotatably mounted thereon about an upright hinge axis of rotation 13. For example, the load coupling part 8 can have a bearing bolt projecting upwards or also a hollow cylindrical bearing stub, which can, for example, be mounted on the rope hinge part by a rolling and/or plain bearing so that it can rotate about said upright axis.

The connection between the rope hinge part 6 and the load coupling part 8 can be configured to rotationally move freely, so that the load coupling part 8 can also rotate freely relative to the rope hinge part 6 when the rotary drive is active, or only the friction needs to be overcome. As described at the beginning, a brake can also be provided between the two parts of the load holding means in order to be able to brake rotational movements.

The rotary drive 14 for rotating the load coupling part 8 relative to the rope hinge part 6 about said upright hinge axis of rotation 13 advantageously operates according to the principle of inertia and applies a torque or a rotary pulse, which is generated according to the principle of inertia, to the rotatably mounted load coupling part 8 and the end tool 9 attached thereto.

As shown in FIG. 2, the rotary drive 14 comprises a flywheel 15, which is mounted on the load coupling part 8 so as to rotate about an upright flywheel axis, which can extend coaxially to the hinge axis of rotation 13. Said flywheel 15 can be housed inside a frame or a housing of the load coupling part 6, see FIG. 2.

Said flywheel 15 is driven by a drive motor 16, which may be configured to be an electric motor. Irrespective thereof, said drive motor 16 can be positioned with its motor output shaft coaxial to the flywheel 15 and can be directly or indirectly, i.e. possibly via a gear stage, drive-connected to the flywheel 15 in order to be able to rotationally accelerate said flywheel 15. Advantageously, the drive motor 16 can not only accelerate the flywheel 15 positively in the sense of increasing the rotational speed, but also accelerate it negatively in the sense of decelerating or reducing the rotational speed. Irrespective thereof, the rotary drive 14 can advantageously be actuated in opposite directions in order to be able to generate torques in different directions.

The drive motor 16 can advantageously be mounted in a rotationally fixed manner, in particular rigidly on the load coupling part 8, preferably mounted inside a frame and/or housing part.

For example, the drive motor 16 can be attached to the axle journal or the hollow cylinder journal, which is rotatably mounted on the rope hinge part 6 and suspends the load coupling part 8 from the rope hinge part 6.

The drive motor 16 can be supplied with energy from an energy storage device 17, which can, for example, comprise one or more rechargeable batteries and/or one or more capacitors in order to be able to store electric power. Advantageously, said energy storage 17 can be detachably attached to an outside of the rope hinge part, for example by form-fitting, detachable locking means, so that it can be easily replaced. Simultaneously, the energy storage 17 weighs down the lower block so that its usual weighting can be eliminated or reduced.

Advantageously, an energy generator 18 can be provided on the rope hinge part 6, in particular in the form of a generator, which can be drive-connected to one of the said deflection pulleys 10, so that each time the hoist rope 7 is actuated and rotates around the said deflection pulley 10, the energy generator is set in motion and generates energy, which can be stored in the energy storage 17.

In order to be able to control the rotary drive 14 as required, the crane 1 comprises a preferably electronic control apparatus 19, which can have a control module provided on the load holding means 4 for controlling the drive motor 16.

The control apparatus 19 can take into account sensor signals from one or more sensors 20, which detect one or more operating and/or environmental parameters and provide a corresponding sensor signal, which is then processed by the control apparatus 19 and converted into a control command for the drive motor 16.

Alternatively or additionally, input means can be provided for the manual input of control commands by a machine operator, which can then be processed in a corresponding manner by the control apparatus 19 and converted into control commands to the drive motor.

Alternatively or additionally, the control apparatus 19 can also be configured to take into account information from a BIM 20 in order to control the rotary drive 14 and ensure a desired rotational position of the load picked up.

In particular, the control apparatus 19 can provide the following control strategies for the rotary drive 14 and possibly also other crane drives:

Requests for slewing movement can be input via manual systems such as the crane's control stand or radio remote control.

Signals from automatic systems such as construction site logistics management systems can be input with enrichment from environment detection systems of the crane or construction site.

The control system can be coupled with various sensors and control the rotary drive of the load holding means and/or other crane drives such as slewing gear, trolley drive and/or hoist rope drive using the sensor signals.

Such sensors can include motion sensors such as gyro sensors to identify rotational movements and/or anemometers to record the wind situation on the hook.

The control system can send signals to the drive unit based on the detected parameters until a suitable rotation is achieved.

The control system can control and regulate the drives so that a predetermined position is maintained.

The control unit can be located in the rotating unit or lower block.

Figure 3:
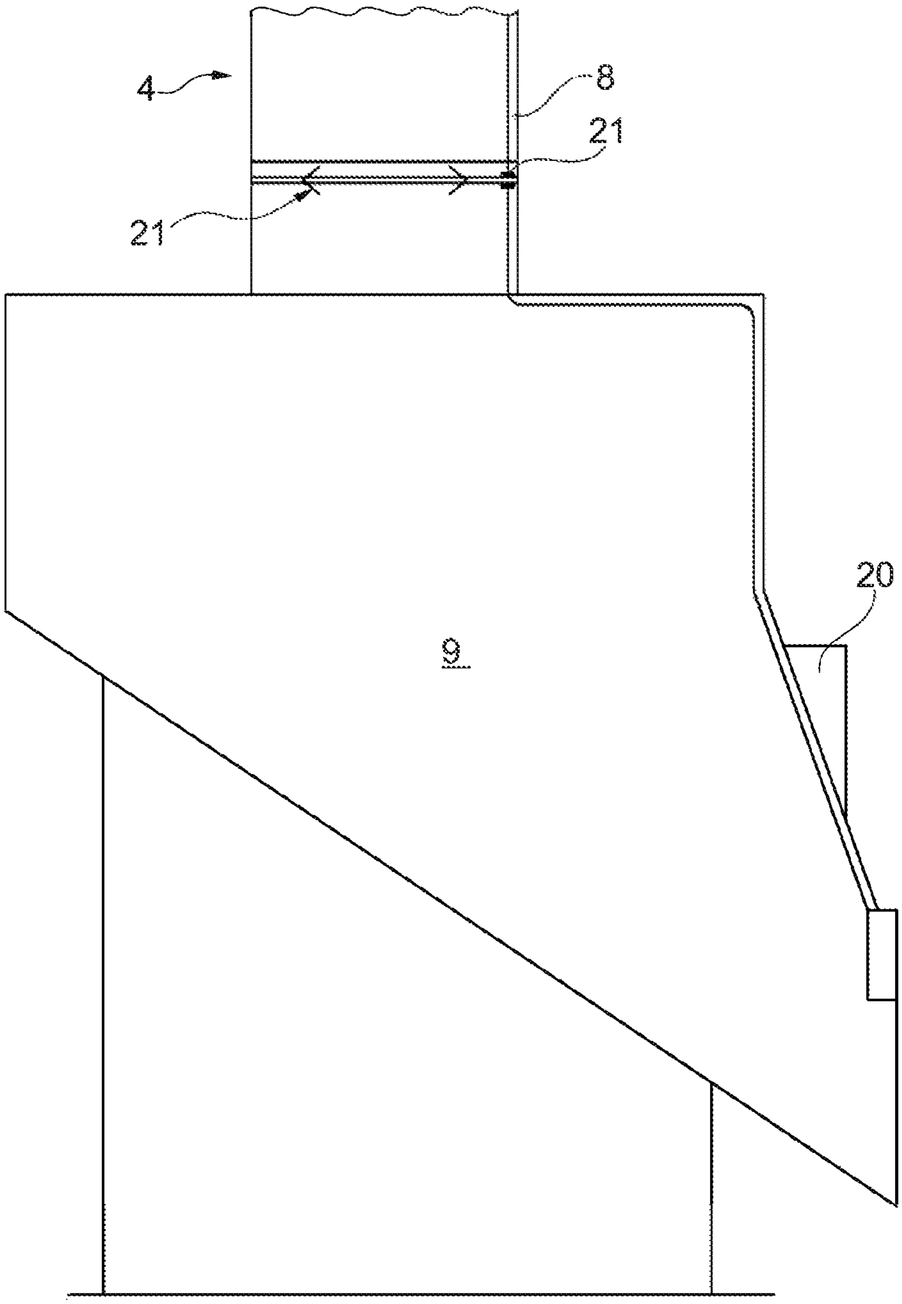
FIG. 3: a side view of the load holding means from FIG. 2 with an end tool in the form of a concrete bucket coupled to it.
Figure 4:
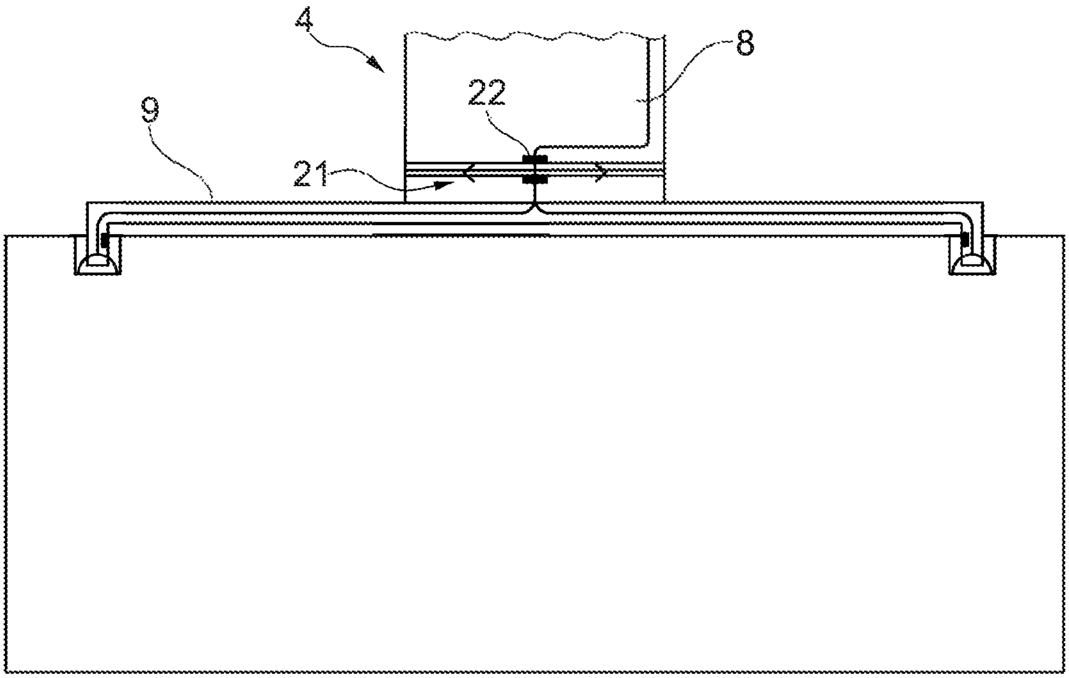
FIG. 4: a side view of the load holding means of FIG. 2 with a load gripper coupled thereto for gripping a load in the form of a prefabricated element.
Figure 5:
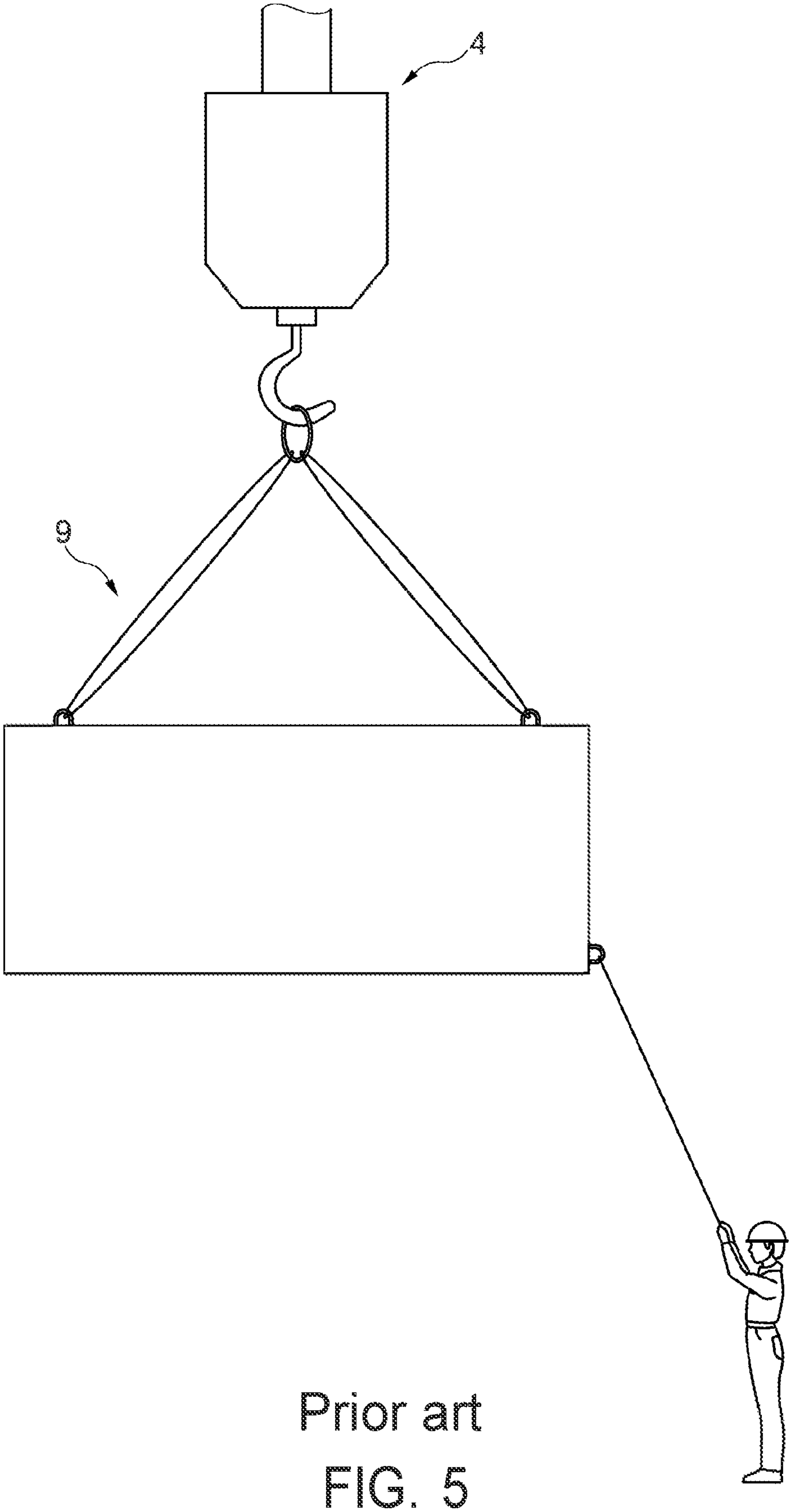
Prior art FIG. 5
FIG. 5: a side view of a load attached to a load hook via slinging means such as chains, which is maneuvered via a guide rope according to the prior art.

As shown in FIGS. 3 and 4, various end tools 9 can be coupled to the load coupling part 8 of the load holding means 4. In this respect, the load coupling part 8 can preferably comprise a quick-coupler 21 in order to hold or lock the end tool 9 to be coupled in a rotationally fixed manner, in particular rigidly, on the load coupling part 8. The interface of the quick-coupler 21 can be adapted to the contour of the end tools 9 to be coupled, as already explained in more detail at the beginning. Preferably, the quick-coupler 21 can have movable locking elements, for example in the form of swivel levers and/or sliders and/or claws, which, depending on the position, are in locking engagement with suitable mating contours on the end tool 9 or can be released therefrom.

The quick-coupler 21 is configured to hold the coupled end tool 9 in a rotationally fixed manner in order to be able to transmit rotary movements of the rotary drive 14 to the end tool 9.

In addition, the load holding means 4, in particular its load coupling part 8, preferably also has energy and/or signal line couplings 22 in order to supply the coupled end tool 9 with energy and/or to be able to exchange signals and/or information between the coupled end tool 9 and the crane 1. This allows the respective functions of the coupled end tool 9 to be supported by the crane 1.

If, as shown in FIG. 3, a concrete bucket is coupled as end tool 9, the following functionalities can be supported, for example:

- In order to open or close the concrete bucket in response to control signals from the crane operator, the corresponding concrete bucket has the necessary geometric interface to transmit the forces and signals.
- At the control signal from the crane operator, the concrete bucket opens its discharge opening so that the fresh concrete pouring process can begin. This process also stops again at the push of a button by the crane operator.
- Alternatively, the concrete bucket can be moved in a desired direction by external force, for example by site personnel. In order to implement this function, the concrete bucket has sensors that detect the force applied and transmit this to the crane control system via the control lines described above. The crane operator must hand over the crane control to the operating personnel. The ground personnel use it to control the load, which steers the crane.
- The turning device, which is integrated in the new lower block, is also available for the automatic concrete bucket. Further functionalities are conceivable.

If, as shown in FIG. 4, a load gripper is coupled as end tool 9, the following functions can be performed or supported, for example:

- To enable automated picking up/releasing of prefabricated elements of all kinds (concrete, wood, glass, . . . ), the actuator for prefabricated elements has the necessary geometric interface to transmit the forces and signals.
- The gripper elements facilitate component handling by quickly coupling with the load (finished elements). The gripping elements have predefined pick-up positions that can be set manually or automatically. The gripping elements move a few centimeters into the opening provided on the prefabricated element and create a force-fit connection. There exists the possibility of feedback to the crane operator as to whether the frictional connection has been established.

To control the load at close range, the gripping device for prefabricated parts can be equipped with sensors detecting an external force and transmitting it to the crane control system via the control lines described above. The crane driver must hand over or have handed over the crane control to the operating personnel. The ground personnel use it to control the load, which steers the crane.

Likewise, the gripping elements have the rotating function of the lower block described above to also simplify load handling under difficult environmental conditions. The rotation function can also simplify the positioning of the prefabricated elements.

After the prefabricated elements have been set down in their final position, the force-fit connection can be released again by deliberately releasing the frictional connection and/or by opening a locking unit.

We claim:

1. A tower crane comprising:

a load holder hinged to a hoist rope, wherein the load holder is configured to be lifted and lowered by the hoist rope, wherein the load holder comprises a rotary drive for rotating a load coupling part with respect to a rope hinge part hinged to the hoist rope about an upright hinge axis of rotation, wherein the rotary drive is configured to be an inertia drive and comprises a flywheel mounted on the load coupling part so as to be rotatable about the upright hinge axis of rotation and configured to be rotationally driven by a drive motor, wherein the rope hinge part has at least one deflection pulley for the hoist rope which is drivingly connected to an energy generator, wherein the crane is configured such that the energy generated by the energy generator during hoist rope movements is stored in an energy storage for supplying energy to the drive motor.

2. The crane of claim 1, wherein the load coupling part is freely rotatably hinged to the rope hinge part by pivot bearing when the rotary drive is active.

3. The crane of claim 1, wherein the drive motor of the rotary drive is attached to the load coupling part is configured to rotate together with the load coupling part.

4. The crane of claim 1, wherein the drive motor is coaxial to the flywheel and is anchored in a rotationally fixed manner to the load coupling part by a motor housing.

5. The crane of claim 1, wherein the flywheel has a moment of inertia with respect to the hinge axis of rotation which is greater by at least a power of ten than the moment of inertia of the rotating assembly of the drive motor including a drive train reaching as far as the flywheel, including a transmission between the drive motor and the flywheel.

6. The crane of claim 1, wherein the flywheel has a diameter which is at least 150% of the diameter of the drive motor and/or at least 50% of the diameter of a deflection pulley of the rope hinge part with a thickness of at least 150% of the thickness of said rope deflection pulley.

7. The crane of claim 1, wherein the flywheel has at least 30% of the weight of the rope hinge part and the load coupling part.

8. The crane of claim 1, wherein the rotary drive comprises an energy storage detachably attached to an outside of the rope hinge part.

9. The crane of claim 1, wherein the load coupling part comprises a quick-coupler for coupling an end tool comprising a concrete bucket and/or load gripper in a rotationally fixed manner.

10. The crane of claim 9, wherein the quick-coupler comprises a form-fitting detachable locker for detachably locking the end tool to the load coupling part in a form-fitting manner.

11. The crane of claim 10, wherein the quick-coupler has an energy line coupling device and/or signal line coupling device for coupling an energy line and/or a signal line of the end tool to be coupled respectively for supplying energy to the end tool from the load holder and/or exchanging signals and/or information between the load holder and a respectively coupled end tool.

12. The crane of claim 1, further comprising a control apparatus for controlling the rotary drive in dependence on at least one sensor signal which reflects at least one operating and/or environmental parameter of the crane and/or of a load attached to the load holder.

13. The crane of claim 12, further comprising a wind sensor for detecting a wind force and/or a wind direction, and wherein the control apparatus is configured to control the rotary drive in dependence on the detected wind force and/or wind direction in such a way that the rotary drive provides a counter-torque balancing a wind torque.

14. The crane of claim 12, wherein the control apparatus is configured to receive target posture information obtained from a construction data model (BIM) communicatively connected to the crane and, in dependence on the received target posture information, to control the rotary drive in such a way that the load coupling part and/or an end tool coupled thereto is moved into a position corresponding to a rotary position information.

15. The crane of claim 12, wherein the control apparatus comprises a manually actuable inputter for inputting a target position of rotation and is configured to control the rotary drive in dependence on a manually input target position of rotation.

16. The crane of claim 12, wherein the control apparatus comprises an electronic control module mounted on the rope hinge part and/or on the load coupling part for controlling the rotary drive.

17. The crane of claim 13, further comprising a movement sensor and/or position sensor comprising a gyroscope sensor for providing rotation rate signals, wherein the position sensor is configured to detect a movement, and wherein the position sensor is configured to detect a position, wherein the control apparatus is configured to control the rotary drive in dependence on the detected movement and/or position of an end tool coupled to the load coupling part.

18. The crane of claim 1, wherein the load coupling part has a quick-coupler for coupling various end tools in a rotationally fixed manner, wherein the end tools comprise such concrete buckets and/or load grippers.

19. The crane of claim 1, further comprising at least one inputter for manually inputting control commands and/or at least one sensor for sensory detection of manual control movements and/or control forces on an end tool coupled to the load coupling part, wherein a control apparatus of the crane is configured to control the rotary drive in dependence on the control commands input on the end tool and/or in dependence on the detected control movements and/or control forces.

20. The crane of claim 1, wherein an end tool comprising a load gripper is locked in a rotationally fixed manner to the load coupling part and is configured to be torsion-resistant with respect to the hinge axis of rotation, wherein the load gripper has a detachable holder for holding a load in a torsion-resistant manner, and wherein the load comprises a prefabricated wall part.

21. A tower crane, comprising:

a load holder hinged to a hoist rope, wherein the load longer is configured to be lifted and lowered by the hoist rope, wherein the load holder comprises a rotary drive for rotating a load coupling part with respect to a rope hinge part hinged to the hoist rope about an upright hinge axis of rotation, wherein the rotary drive is configured to be an inertia drive and comprises a flywheel mounted on the load coupling part so as to be rotatable about the upright hinge axis of rotation and configured to be rotationally driven by a drive motor, wherein the load coupling part comprises a quick-coupler for coupling an end tool comprising a concrete bucket and/or load gripper in a rotationally fixed manner, wherein the quick-coupler comprises a form-fitting detachable locker for detachably locking the end tool to the load coupling part in a form-fitting manner, wherein the quick-coupler has an energy line coupling device and/or signal line coupling device for coupling an energy line and/or a signal line of the end tool to be coupled respectively for supplying energy to the end tool from the load holder and/or exchanging signals and/or information between the load holder and a respectively coupled end tool.

22. A tower crane, comprising:

a load holder hinged to a hoist rope, wherein the load longer is configured to be lifted and lowered by the hoist rope, wherein the load holder comprises a rotary drive for rotating a load coupling part with respect to a rope hinge part hinged to the hoist rope about an upright hinge axis of rotation, wherein the rotary drive is configured to be an inertia drive and comprises a flywheel mounted on the load coupling part so as to be rotatable about the upright hinge axis of rotation and configured to be rotationally driven by a drive motor, wherein a control apparatus is configured to receive target posture information obtained from a construction data model (BIM) communicatively connected to the crane and, in dependence on the received target posture information, to control the rotary drive in such a way that the load coupling part and/or a end tool coupled thereto is moved into a position corresponding to a rotary position information.

* * * * *